July 16, 1963 A. J. KARNIE 3,098,022
COVERING A CORE BY EXTRUSION
Filed Aug. 11, 1960 2 Sheets-Sheet 1
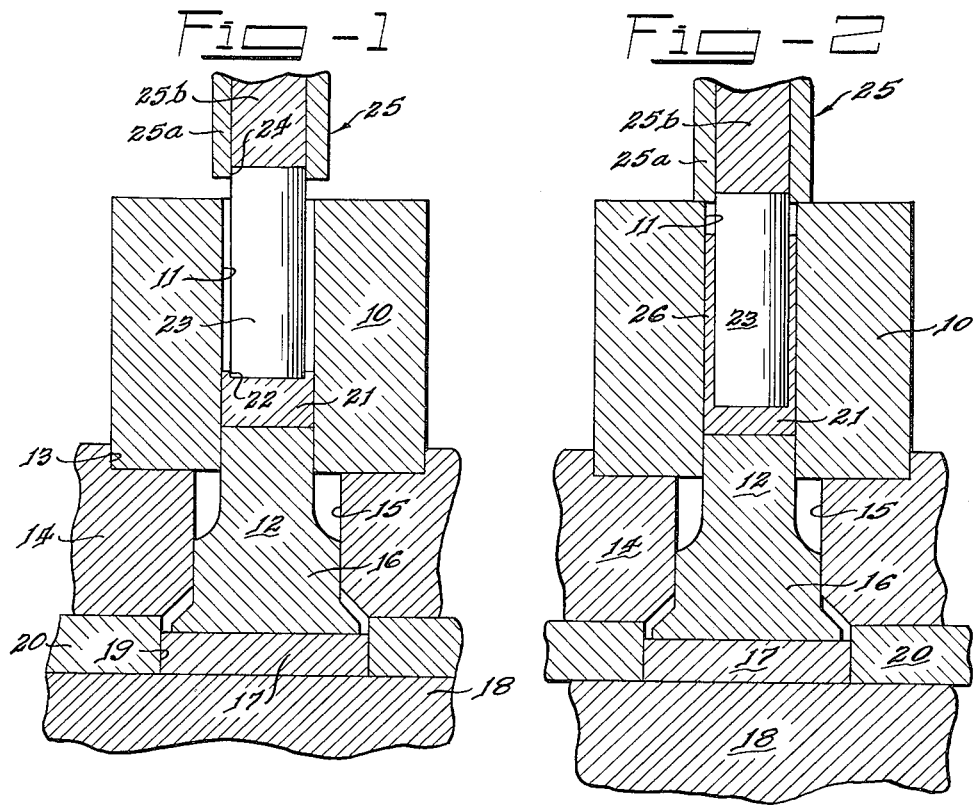
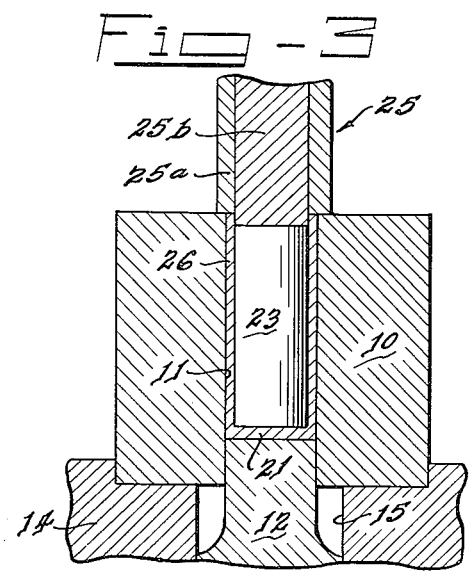
INVENTOR.
Anthony J. Karnie
BY
Roland A. Anderson
Attorney July 16, 1963
A. J. KARNIE
3,098,022
COVERING A CORE BY EXTRUSION
Filed Aug. 11, 1960
2 Sheets-Sheet 2
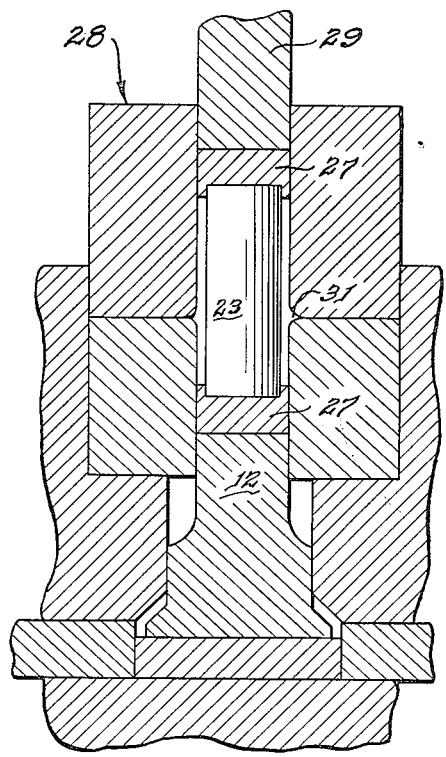
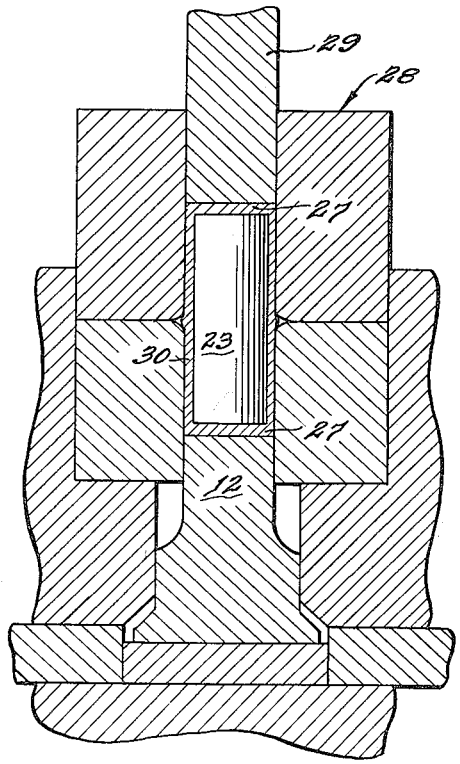
INVENTOR.
Anthony J. Karnie
BY
Attorney United States Patent Office 3,098,022
Patented July 16, 1963

3,098,022
COVERING A CORE BY EXTRUSION
Anthony J. Karnie, Richland, Wash., assignor to the United States of America as represented by the United States Atomic Energy Commission
Filed Aug. 11, 1960, Ser. No. 49,111
1 Claim. (Cl. 204—154.2)

This invention relates to a method of applying a protective jacket to a core. More specifically, the invention relates to a method by which a metal jacket is flowed about a metal core so as to protect the same as well as to become intimately associated therewith for the sake of good heat transfer between core and jacket.

Nuclear reactors are known which employ fuel elements consisting of fissionable cores and protective metal jackets. When the cores are of natural uranium or uranium with a small amount of $U^{235}$ enrichment, it is highly desirable to use aluminum for the jacket because of its low neutron-absorption cross section and its high resistance to corrosion by cooling water. There is considerable difficulty in applying an aluminum jacket to a uranium core, for the contact between them must be intimate enough for a relatively high rate of heat transfer to occur if satisfactory cooling is to be carried out.

At the present time an intermediate bonding layer of aluminum-silicon is used to promote good heat transfer between jacket and core, but dipping of the core in aluminum-silicon is difficult and costly. Moreover, the aluminum-silicon layer reduces the diameter of the uranium core for a given thickness and outer diameter of the aluminum jacket.

I have remedied the above drawback by eliminating the intermediate bonding layer and directly applying the core and jacket to one another in a process involving pushing the core into the jacket so as to flow or extrude the jacket about the core. Broadly, this process is applicable to any core and jacket materials so long as the jacket material is sufficiently softer than the core material.

In the drawings:

FIG. 1 is a sectional view through an extrusion apparatus at the start of the process of the present invention;

FIG. 2 is a sectional view similar to FIG. 1 showing the extrusion apparatus after the initial step of the present process;

FIG. 3 is a view similar to FIGS. 1 and 2 showing the apparatus at the end of the process;

FIG. 4 is a sectional view of an apparatus designed to perform a modification of the present process; and FIG. 5 is a view similar to FIG. 3 showing the apparatus after completion of the modified process.

As shown in FIGS. 1 and 2, a female die 10 has a circular cylindrical opening 11, in the lower end of which a stationary male die 12 fits. The female die 10 rests in a recess 13 formed in a block 14, which has an opening 15 fitting an enlarged portion 16 of the male die 12. The male die 12 is carried on an inner support 17, which is mounted on a base 18. The inner support 17 fits an opening 19 formed in an outer support 20 through which the block 14 is carried on the base 18.

As shown in FIG. 1, a block 21 of commercially pure aluminum shaped, No. 1100, as a cylinder of circular section, rests on the stationary male die 12 and fits the opening 11 in the female die 10. The upper end of the block 21 has a shallow circular cylindrical recess 22, into which fits a cylindrical circular core 23 formed of natural uranium or uranium containing $U^{235}$ to the extent of 1.75% by weight. The upper end of the core 23 protrudes from the female die 10 and fits a shallow circular cylindrical recess 24 formed in the lower end of a ram 25. The recess 24 is formed by an outer cylindrical annular part 25a and an inner cylindrical solid part 25b, which parts are circular in section and form the ram 25.

The aluminum block 21 is heated to a temperature between 640° F. the annealing temperature of aluminum, and 800° F. above which the strength of the uranium core 23 is impaired, before being applied to the dies 10 and 12 as shown and described with reference to FIG. 1. Now the core 23 is pushed down into and against the block 21 by the ram parts 25a and 25b moving together, so that, as shown in FIG. 2, a thin aluminum skirt 26 is extruded from the block 21 and flowed along the core 23 in intimate contact therewith by virtue of being confined by the opening 11 in the female die 10. The centering of the core 23 in the recesses 22 and 24 in the stationary male die 12 and the ram 25 assures a uniform thickness to the skirt 26. In the position of FIG. 2 the outer ram part 25a has reached the female die 10, and the upper end of the skirt 26 is near, but still somewhat spaced from the outer ram part 25a. Now the inner ram part 25b is moved downwardly independently of the outer ram part 25a for a short distance into the female die 10 to the position of FIG. 3, causing the skirt 26 to be flowed upward somewhat beyond the upper end of the core into engagement with the lower end of the outer ram part 25a.

The core 23 jacketed in the skirt 26 is removed from the apparatus and a closure (not shown) is welded or soldered to the protruding end of the skirt 26 to complete the encasing of the core 23.

Alternatively, the skirt 26 may be flowed somewhat farther beyond the core 23 than is shown in FIG. 3, and closed over the upper end of the core 23 by a process such as disclosed in copending Last application, S.N. 621,973, filed November 13, 1956, now U.S. Patent No. 2,945,293, according to which the end of the skirt is upset and flowed into a recess in the end of the core.

The core 23 may be 4.01" in length and 1.336" in diameter. The block 14 may be 1.636" in height and 1.558" in diameter and have its recess 22 1.336" in diameter and .125" in depth. The skirt 26 may be .111" in thickness and extend beyond the upper end of the core 23 an amount equal to .185", which may also be the thickness of the base portion from which the skirt 26 extends.

In the modification of FIGS. 4 and 5, recessed aluminum blocks 27 are heated and applied to both ends of the core 23 for processing in an apparatus that differs from that of FIGS. 1, 2, and 3 in a two-part female die 28 and in a blunt or unrecessed ram 29 capable of entering the female die 28. The ram 29 is applied against the upper aluminum block 27 so that the ends of the core 23 are pushed into the two blocks 27, with the result that the blocks 27 become extruded as thin aluminum skirts 30 between the core 23 and the aligned openings in the parts of the female die 28. The skirts 30 move toward one another in intimate association with the core 23, abut, and become joined to one another.

The parts of the female die 28 are so shaped at the adjacent ends of their aligned openings as to form a space 31, into which the abutting ends of the skirts 30 will be upset and moved radially outward. By this action, any oxides at the ends of the skirts 30 are pushed to one side into the space 31 and so do not interfere with a good juncture of the skirts. The portion of the skirts 30 protruding into the space 31 is, of course, cut off after the fuel element is removed from the apparatus.

In this modification, the core 23 may also be 4.01" in length and 1.336" in diameter. Each of the blocks 27 may be 0.735" in height, 1.558" in diameter, and the recess in each block 27 may be .125" in depth and 1.336" in diameter. The skirts 30 may be .111" in thickness and extend from base portions .185" thick.

Cooling of the skirts 26 and 30 helps to bring about tight engagement between the skirts and the core 23. Such engagement may be enhanced by supplemental working such as drawing or die-pressing or fluid-pressing.

The intention is to limit the invention only within the scope of the appended claim.

What is claimed is:

A method of applying a jacket to a cylindrical core, said method comprising placing flat sides of two cylindrical blocks of jacketing material against the flat ends of the cylindrical core, exerting opposing pressures at a temperature between 640° and 800° F. against the flat sides of the blocks opposite the sides against the flat sides of the core, thereby causing the jacketing material to flow around the core in two skirts which approach each other from opposite ends of the core, the said skirts being completely protected from the oxygen of the atmosphere except for their approaching edges, continuing the said opposing pressures for a time sufficient to cause the said approaching edges to meet and flow outward from the core in the shape of an annular raised portion, thereby carrying with them oxides formed by reason of their exposure to the oxygen of the atmosphere and causing said raised portion to occlude said oxides and to form, immediately next to the core, an annular bond free of oxides between portions of the said skirts just above and below said approaching edges, discontinuing the pressures and cooling the core so jacketed by the skirts, and cutting off the annular raised portion of the jacketing material occluding the said oxides, thereby removing the said oxides from the jacketed core.

References Cited in the file of this patent

UNITED STATES PATENTS

| | | |
|---|---|---|
| 590,130 | Bungerforth | Sept. 14, 1897 |
| 1,321,096 | Geen | Nov. 11, 1919 |
| 1,702,278 | Simons | Feb. 9, 1929 |
| 2,789,344 | Kaul | Apr. 23, 1957 |
| 2,908,073 | Dunlin | Oct. 13, 1959 |
| 2,945,293 | Last | July 19, 1960 |

FOREIGN PATENTS

| | | |
|---|---|---|
| 21,052 | Great Britain | Nov. 21, 1900 |
| 118,383 | Germany | Mar. 12, 1901 |
| 800,470 | Great Britain | Aug. 27, 1958 |

OTHER REFERENCES

Atomic Energy of Canada document CRE-701, April 1957.